Patented Oct. 7, 1941

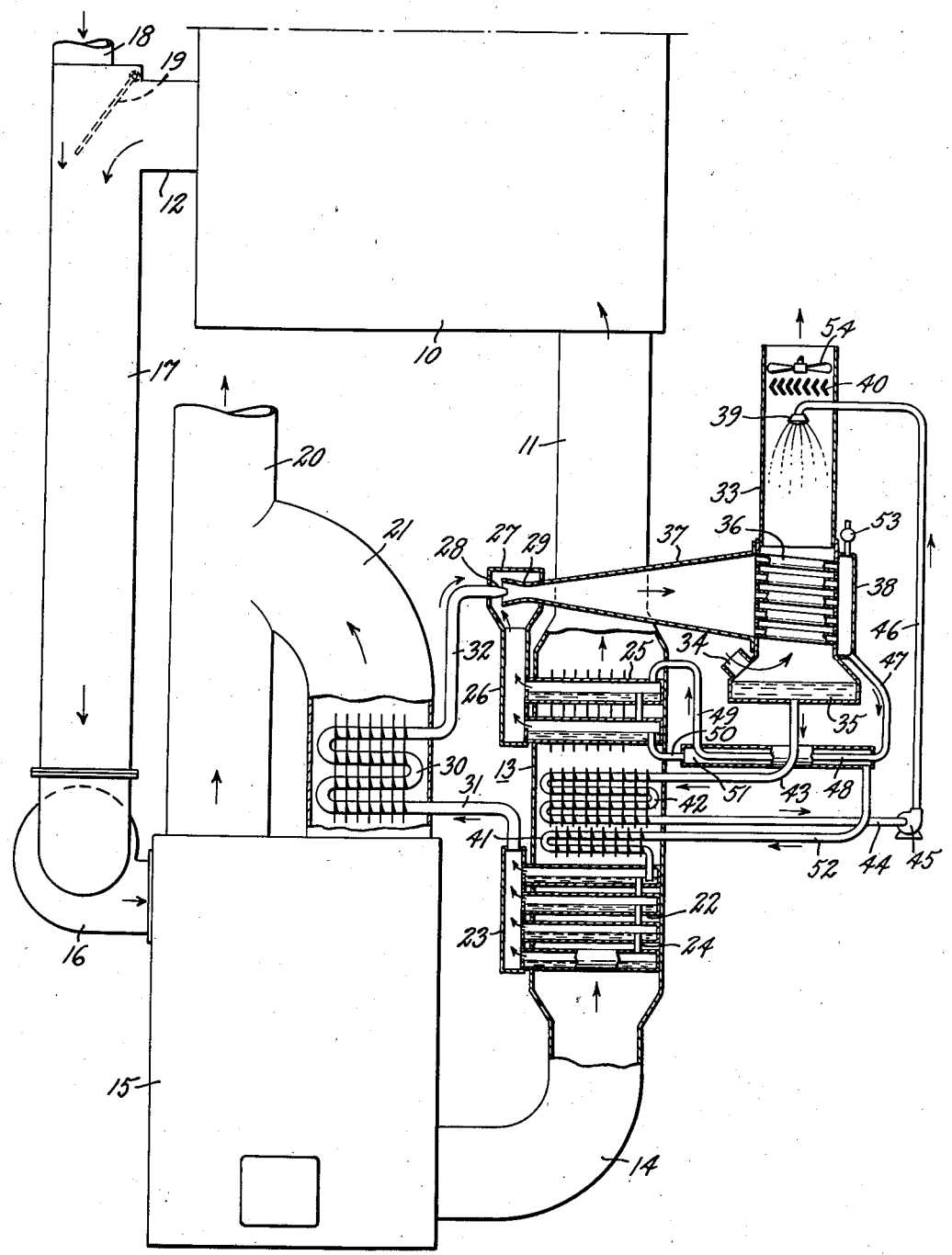

2,257,983

UNITED STATES PATENT OFFICE 2,257,983

REFRIGERATION

Bennet Carroll Shipman, deceased, late of Arlington County, Va., by Clara Wood Shipman, executrix, Birmingham, Ala., assignor to Servel, Inc., a corporation of Delaware Application December 7, 1938, Serial No. 244,364

18 Claims. (Cl. 183—4)

This invention relates to refrigeration and more particularly to air cooling. It is an object of the invention to simply and economically cool air toward a temperature below the wet bulb temperature of atmosphere with heat dissipation to the atmosphere.

Heat of air to be cooled is first used to vaporize a refrigerant fluid in a higher pressure place of evaporation. The resulting vapor is then used to withdraw refrigerant vapor from a lower pressure place of evaporation at which place the air is further cooled. The refrigerant vapor is re-liquefied by cooling obtained from evaporation of water in the atmosphere.

The invention, together with the above and further objects and advantages, will be more fully understood upon reference to the following description and accompanying drawing in which the single figure shows more or less diagrammatically an absorption type system embodying the invention for conditioning air for comfort.

A room 10 has an air inlet conduit 11 and an air outlet conduit 12. Conduit 11 is connected to the upper end of a heat exchanger casing 13. The lower end of heat exchanger 13 is connected by a conduit 14 to the outlet of an absorber 15. The inlet of absorber 15 is connected by a blower 16 and a conduit 17 to the room discharge conduit 12. An air inlet conduit 18 is connected to conduit 17 adjacent the connection thereto of conduit 12. A damper 19 is adjustable to vary relative flow of air in conduits 18 and 12 with respect to conduit 17.

The absorber 15 may be of any known type. The words absorption and absorber are herein used to include adsorption and adsorber. The absorber 15 may contain silica gel, activated alumina, activated carbon, or other suitable substance for absorbing water vapor. A heater, not shown, is provided in the absorber 15 for heating air to intermittently or continuously reactivate the absorbent. The absorber is provided with a stack 20 for the heater and a discharge conduit 21 for the reactivating hot air. The conduit 21 is conveniently connected to the stack 20 above the absorber.

In the lower part of heat exchanger 13 is a boiler or evaporator shown as tubes 22 connected to a header 23. The tubes 22 are connected by conduits 24 which together with the tubes are arranged so that the tubes will contain liquid supplied thereto at a level about half way up each tube. In the upper end of heat exchanger 13 is a second similar evaporator comprising finned tubes 25 connected to a header 26. The upper end of header 26 is connected to an ejector housing 27 containing an injection nozzle 28 and a discharge nozzle 29.

In the absorber conduit 21 is a finned pipe coil 30. The lower end of coil 30 is connected by a conduit 31 to lower evaporator header 23. The upper end of coil 30 is connected by a conduit 32 to the ejector nozzle 28.

An evaporative condenser comprises an upright casing 33 providing an air inlet 34 and a liquid sump 35 in the lower end. A plurality of condenser tubes 36 extend through the casing 33. A casing 37 forms a header for one end of the tubes 36. A jacket 38 forms a header for the other end of the tubes 36. Casing 37 is connected to the ejector discharge nozzle 29. Above the condenser tubes 36 is a spray nozzle 39. Above the spray nozzle 39 are free moisture removing baffles 40. Above the baffles 40 is a fan 54 operated by a suitable motor, not shown, to cause upward flow of air through casing 33.

In the heat exchanger 13, intermediate the evaporators 22 and 25, are an upper coil 42 and a lower coil 41. These are finned pipe coils. The condenser sump 35 is connected by a conduit 43 to the upper end of coil 42. The lower end of coil 42 is connected by a conduit 44, a liquid pump 45, and a conduit 46 to the condenser spray nozzle 39.

The condenser tube header 38 is connected by a conduit 47, inner passage 48 of a liquid heat exchanger, and a conduit 49 to the upper tube of evaporator 25. The lower tube of evaporator 25 is connected by a conduit 50, outer passage 51 of the liquid heat exchanger, and conduit 52 to the upper end of coil 41. The lower end of coil 41 is connected to the upper tube of evaporator 22.

A vacuum pump 53 is connected to the condenser tube header 38 for evacuating the circuit in which this condenser is connected and to remove any non-condensible gases that may be formed in the circuit during operation. The circuit is supplied with a suitable refrigerant fluid such as water.

The condenser sump 35 and the conduits connected thereto are filled with water, and a connection, not shown, may be provided for keeping the supply of water constant during operation of the system, as known.

The blower 16 causes air to flow from room 10 through conduit 12, conduit 17, absorber 15, conduit 14, heat exchanger 13, and conduit 11 back to room 10. In conduit 17, some atmospheric air from conduit 18 is mixed with recirculated air as determined by the setting of damper 19.

The air is dried in absorber 15. The hot dry air flows upward in heat exchanger 13 first in contact with evaporator 24, and then in contact with coils 41 and 42, and then in contact with evaporator 25. The hot air from conduit 14 causes water to vaporize in the evaporator 22. The vapor formed in the evaporator tubes 22 flows into header 23 and thence through conduit 31, coil 30, and conduit 32 to the ejector nozzle 28. The vapor is superheated in coil 30 when hot air used for absorbent reactivation flows over this coil. Vapor from nozzle 28 is injected through nozzle 29 into the condenser casing 37. This action withdraws vapor from evaporator tubes 25 through header 26 and ejector casing 27 through nozzle 29 into the condenser casing 37.

Liquid pump 45 is operated to cause water to flow from sump 35 through conduit 43, coil 42, conduit 44, and conduit 46 to the spray head 39. Water is sprayed from the head 39 downward over condenser tubes 36. Fan 54 causes air to flow through inlet 34 and upward through casing 33 over the condenser tubes 36. The descending water evaporates in the presence of the air so that the condenser tubes 36 are cooled toward the wet bulb temperature of the air. Vapors condense to liquid in the condenser tubes 36. The liquid condensate flows into header 38 and then flows through conduit 47, liquid heat exchanger passage 48, and conduit 49 into the upper tube of evaporator 25. The liquid overflows from one tube to another in conduit 25 and then flows through conduit 50, liquid heat exchanger passage 51, conduit 52, and coil 41 into the upper tube of evaporator 22. The liquid overflows from one tube to another in evaporator 22.

Due to the action of the ejector 27, water evaporates at a lower pressure and therefor a lower temperature in evaporator 25 than in evaporator 22. Water flowing from evaporator 25 to evaporator 22 is preheated first by cooling condensate flowing to evaporator 25 through liquid heat exchanger 48 and then in coil 41 by cooling air flowing upward through heat exchanger 13. The difference in pressures between the condenser and upper evaporator 25 is balanced by a liquid column in the trap formed by conduit 47, liquid heat exchanger passage 48, and conduit 49. The difference in pressures between upper evaporator 25 and lower evaporator 22 is balanced by a column of liquid standing in coil 41, conduit 52, liquid heat exchanger passage 51, and conduit 50.

Hot air from the absorber 15 is cooled in successive stages as it flows upward through heat exchanger 13 first in contact with the high temperature evaporator 22, then in contact with coils 41 and 42, and then in contact with low temperature evaporator 25. Since the condenser 36 is cooled toward the wet bulb temperature of the atmosphere, and ejector 27 creates a lower pressure in evaporator 25 than in the condenser, evaporator 25 operates to cool the air toward a temperature below the wet bulb temperature of the atmosphere.

Various changes and modifications may be made within the scope of the invention which is not limited except as indicated in the following claims.

What is claimed is:

1. A method of refrigeration which includes evaporating refrigerant fluid at a first temperature and pressure by heat transfer from a medium to be cooled, utilizing the resulting vapor to create a region of lower pressure, evaporating refrigerant fluid at a lower temperature at said lower pressure by further heat transfer from said medium to be cooled, and liquefying vaporous refrigerant fluid from both said evaporating steps by condensation at an intermediate temperature and pressure.

2. A method of refrigeration as set forth in claim 1 in which vaporous refrigerant fluid liquefied by condensation is again vaporized under said different conditions of pressure and temperature.

3. A method of refrigeration as set forth in claim 1 in which said intermediate temperature is substantially the wet bulb temperature of the atmosphere.

4. A method of refrigeration as set forth in claim 1 in which the vapor formed under the highest pressure and temperature conditions is caused to be superheated.

5. A method of refrigeration as set forth in claim 1 in which said medium to be cooled is air and in which the air is first dehydrated by a process involving application of heat to reactivate moisture absorbing medium, and vapor formed under said higher temperature and pressure conditions is caused to be superheated by heat from said process.

6. A refrigeration system including a first place of evaporation, a second place of evaporation, means to conduct a medium to be cooled in thermal exchange relation first with said first place of evaporation and then with said second place of evaporation, means utilizing vapor from said first place of evaporation for causing reduction in pressure in said second place of evaporation below the pressure in said first place, and a condenser receiving vapor from both of said places of evaporation and operative to liquefy the vapor at a pressure intermediate the pressures of said places of evaporation.

7. A refrigeration system as set forth in claim 6 in which said condenser is connected to deliver condensed liquid to said places of evaporation.

8. A refrigeration system as set forth in claim 6 in which said second mentioned means is an aspirator.

9. A refrigeration system as set forth in claim 6 which also includes means for superheating vapor from said first place of evaporation.

10. An air cooling system including two evaporators, means utilizing vapor from one of said evaporators to withdraw vapor from the other of said evaporators at a lower pressure, a condenser connected to receive vapor from said evaporators, and conduits for conducting liquid from said condenser to said low pressure evaporator and from said low pressure evaporator to the higher pressure evaporator including a heat exchanger for the liquid flowing to and from said low pressure evaporator.

11. An air cooling system as set forth in claim 10 in which the air to be cooled flows in thermal exchange relation first with said high pressure evaporator and then with said low pressure evaporator, and said conduits also include a heat exchanger for heating liquid flowing to said high pressure evaporator by heat transfer to air after heat exchange with said high pressure evaporator.

12. An air cooling system as set forth in claim 10 in which said condenser is an evaporative condenser utilizing evaporation of water in the presence of atmospheric air for cooling of the condenser, means for conducting air to be cooled in thermal exchange relation with said evaporators in series respectively, and means for conducting condenser cooling water in heat transfer relation with air to be cooled intermediate said high and low pressure evaporators.

13. An air conditioning system including an absorber, a source of heat for reactivating said absorber, two evaporators, means utilizing vapor from one of said evaporators to withdraw vapor from the second of said evaporators at a lower pressure, means utilizing heat from said source for superheating vapor from said first evaporator, and means for conducting hot dry air from said absorber in thermal exchange relation first with the high pressure evaporator and then with the low pressure evaporator.

14. An air conditioning system as set forth in claim 13 in which said vapor withdrawing means is an ejector, and including an evaporative condenser for receiving vapor from said evaporators and delivering liquid to the low pressure evaporator and thence to the high pressure evaporator.

15. A process of conditioning air which includes dehumidifying air by passing the air in contact with water absorption material, and utilizing the resulting heat of absorption for producing refrigeration to cool the dried air.

16. A process as set forth in claim 15 in which heat is supplied to expel water from said material, and heat from that supplied is also used in producing said refrigeration.

17. A process of conditioning air which includes dehumidifying air by absorption of water therefrom, and utilizing heat of said absorption to produce refrigeration for cooling the dried air.

18. An air conditioning system including an absorber for drying air, a heat operated refrigeration system for cooling the dried air, and means for conducting heat from said absorber to said refrigeration system to supply operating heat for the latter.

CLARA WOOD SHIPMAN,
*Executrix of the Estate of Bennet Carroll Shipman, Deceased.*